United States Patent [19]
He et al.

[11] Patent Number: 5,955,720
[45] Date of Patent: Sep. 21, 1999

[54] SEMI-RETROREFLECTIVE SCANNERS

[75] Inventors: Duanfeng He, Ronkonkoma; Richard Isaac, East Northport; Mehul Patel, Commack; Daniel Brown, East Northport, all of N.Y.

[73] Assignee: Symbol Technologies, Inc., Holtsville, N.Y.

[21] Appl. No.: 08/619,244

[22] Filed: Mar. 21, 1996

[51] Int. Cl.$^6$ .................................................. G06K 07/10
[52] U.S. Cl. .......................................... 235/462; 235/467
[58] Field of Search ................................. 235/462, 372, 235/469, 454, 463, 470, 458, 468

[56] References Cited

U.S. PATENT DOCUMENTS

| | | | |
|---|---|---|---|
| 4,409,470 | 10/1983 | Shepard et al. | 235/472 |
| 4,575,625 | 3/1986 | Knowles | 235/472 |
| 4,816,661 | 3/1989 | Krichever et al. | 235/472 |
| 4,877,949 | 10/1989 | Danielson et al. | 235/472 |
| 5,157,687 | 10/1992 | Tymes | 235/472 |
| 5,340,971 | 8/1994 | Rockstein et al. | 235/472 |

FOREIGN PATENT DOCUMENTS

1045216  1/1986  Japan ..................... 235/457

*Primary Examiner*—Donald T. Hajec
*Assistant Examiner*—Thien Minh Le
*Attorney, Agent, or Firm*—Finnegan, Henderson, Farabow, Garrett & Dunner, L.L.P.

[57] ABSTRACT

A semi-retroreflective optical scanning system has an optical scanning element which directs a scanning light beam via a stationary holographic optical element in a scan path across indicia to be read. Light from the indicia is collected by an optical collector, such as a lens or a mirror, which focuses it onto a small optical detector via the scanning element. The field of view of the optical detector scans across the indicia in synchronization with the outgoing scanning beam from the holographic optical element. Since the incoming reflected light is not limited by the aperture of the scanning element, the signal-to-noise ratio remains high even when a small scanning element is used. In a further embodiment the light source, scanning element collector and detector are provided in a common plane, the collector and scanning element sharing a common optical axis and a light source being provided substantially off axis to allow reduction in the scanning element size. In a further aspect of the invention a solid state reader is provided capable of establishing the distance to the target by sensing the exact position on the detector at which the target is imaged. According to yet a further aspect of the invention the problem of specular blinding is overcome by providing a plurality of sensors activated in a dynamic on-off sequence, for example a random sequence.

34 Claims, 7 Drawing Sheets

SEMI-RETROREFLECTIVE SCANNERS

BACKGROUND OF THE INVENTION

1. Field of the Invention

The present invention relates to optical scanners, and particularly to a semi-retroreflective system. The invention further relates to optical scanners capable of calculating the distance to a target and optical scanners arranged to overcome the problem of specular reflection "blinding".

2. Discussion of the Prior Art

In optical scanning systems (for example for scanning bar code symbols) a light beam is scanned across an indicia to be read, and reflected light is collected, using either retroreflective or non-retroreflective collection optics.

In retroreflective light collection, a single optical component, e.g. a rotating mirror, as described in Krichever et al. U.S. Pat. No. 4,816,661 or Shepard et al. U.S. Pat. No. 4,409,470, both herein incorporated by reference, scans the beam across a target surface and directs the collected light to a detector. The rotating mirror must be relatively large to receive the incoming light, but only a small detector is required because the rotating mirror can focus the light on to a small area. As a result, the detector has a relatively small field of view, which increases signal-to-noise ratio. Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same rotating mirror used for scanning. Instead, the detector is constructed to have a large field of view so that the reflected laser light traces across the surface of the detector. Because the rotating mirror need only handle the outgoing light beam, it can be made much smaller. But the detector must be relatively large in order to receive the incoming light beam from all scanned locations. This arrangement necessarily means a low signal-to-noise ratio.

It has become increasingly desirable not only to increase the scanning rate of bar code scanners (e.g., to increase the throughput of scanned items), but also to increase the signal-to-noise ratio of bar code scanners to accommodate the increasing information density stored in bar code labels.

In recent years, there have been increasing demands for storing more information in a bar code label. In particular, there is a desire to create a "portable data file", as opposed to the "license plate" nature of conventional bar code symbols. For example, a typical UPC bar code only contains the manufacturer's code and the item number. The price look-up must be accessed in a database keyed to the item number in the bar code. Alternatively, a two-dimensional bar code could be used to store all of the relevant information, such as price, the name of the product, manufacturer, weight, inventory data, and expiration date. This would constitute a "portable data file" because the information could be retrieved without access to a database. While a price look-up database file is conveniently available in a retail environment, this may not be the case in other applications.

Although two-dimensional bar code schemes do not have vertical redundancy, they incorporate other forms of redundancy as well as other advantages, while increasing the density of information storage. For example, Code PDF417 allows stitching of partial scans, error detection, and error correction.

Our co-pending application Ser. No. 08/268,360, filed Jun. 30, 1994, and commonly assigned with the present application, describes a system which satisfies the seemingly conflicting requirements, encountered in conventional retroreflecting and non-retroreflecting scanning schemes, of both a large working range and high scan speeds. It does, however, require the use of a two-dimensional array of individual light detection elements, which may not always be desirable for reasons of cost.

Hand-held solid state scanners do not have any built-in device or technique for estimating the distance to a target as a result of which such scanners have a limited depth of field compared to laser scanners. Although the depth of field can be increased by use of a high quality optical system the cost of the scanner is thus considerably increased.

Known scanners, and in particular omni-directional scanners suffer from a further problem of undesirable specular reflection caused by the undesirable deflection of a beam reflected from an indicia to be read onto a photodetector.

SUMMARY OF THE INVENTION

It is an object of the present invention at least to alleviate some of the difficulties inherent in the prior art.

It is a further object to provide the benefits of a retroreflective system to a scanner having a small scan element.

It is a further object to provide a reader capable of range-finding without the need for complex optics.

It is a further object to overcome the problem of specular blinding in a scanner.

According to the first aspect of the present invention there is provided a system for reading indicia having areas of differing light reflectivity on a target, comprising:

a light source for producing an outgoing light beam;
 a scanning first optical element for receiving the light beam and producing a scanning outgoing light beam therefrom;
 a second optical element for receiving the scanning light beam and redirecting the scanning beam in a direction towards the target so as to produce a scan across the indicia to be read;
 a light detector having a field of view for detecting the light reflected from said indicia and producing electrical signals responsive to the light received; the scanning first optical element receiving light reflected back from the indicia and directing such light to the detector, so that the detector images a field of view across the indicia.

In another aspect there is provided a scanner for reading indicia having areas of differing light reflectivity, the scanner comprising:

a light source for producing a light beam;
 a scanning first optical element for receiving the light beam and producing a scanning outgoing light beam therefrom;
 a second optical element for receiving the scanning light beam and redirecting the scanning beam to scan across an indicia to be read;
 a light detector having a field of view;
 whereby light reflected back from the indicia is received at the scanning first optical element and is directed to the detector, thereby scanning the detector's field of view across the indicia; the further optical element being arranged to direct the outgoing light beam in a direction which corresponds to the said scanning field of view.

With such an arrangement, the field of view of the detector is effectively scanned across the indicia in synchronisation with the scanning outgoing light beam. Since the outgoing beam always tracks the scan to field of view, the field of view can be made relatively small, thereby providing a good signal-to-noise ratio. Since the scanning element is no longer the limiting aperture for the received light, the detected signal remains high independently of the size of the optical element. This means that the element can be made small and light, thereby reducing energy consumption and permitting high-frequency scanning.

According to the invention there is further provided a reader for reading indicia having areas of differing light reflectivity, comprising a light source for producing an outgoing light beam;

a scanning first optical element for receiving the light beam and producing a scanning outgoing light beam therefrom;

a second optical element for receiving the scanning light beam and re-directing the scanning beam towards the indicia;

a collector for collecting light reflected from the indicia and directing the collected light towards the first optical element; and a detector for detecting collected light reflected from the first optical element; wherein the light source, first optical element and collector are provided in a common plane, the collector and first optical element being provided on a common optical axis and the light source being arranged to generate a beam at a substantial angle to the common optical axis. As a result of the arrangement outgoing light sees the scanning element at half the scanning angle that the collected light sees it. Accordingly a smaller scanning mirror can be provided.

According to the invention there is yet further provided a reader for reading indicia having areas of differing light reflectivity on a target, comprising a light source for producing an outgoing light beam, a detector for detecting the light beam reflected from the target and a target distance sensor for establishing the target distance by ascertaining the position of the target image on the detector. A simple range finding system is thus provided.

According to the invention there is still further provided a reader for reading indicia having areas of differing light reflectivity on a target, comprising:

a light source for producing an outgoing light beam; and at least two detectors spaced apart from one another for detecting light reflected from the target wherein the detectors are arranged to be switched on and off in a dynamic sequence. The problem of specul blinding is thus avoided.

BRIEF DESCRIPTION OF THE DRAWINGS

The invention may be carried into practice in a number of ways and two specific embodiments will now be described, by way of example, with reference to the accompanying drawings, in which:

FIG. 1b is a perspective view corresponding to FIG. 1a;

FIG. 2b is a perspective view corresponding to FIG. 2a;

DETAILED DESCRIPTION OF THE DRAWINGS

Figure 1A:
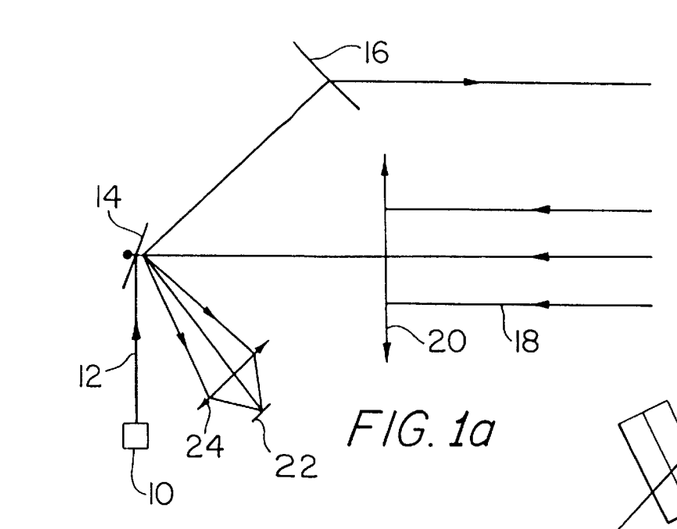
FIG. 1a illustrates schematically a scanner embodying the present invention.

Turning first to FIG. 1a, there is shown in schematic form a semi-retroreflection collection design system according to a first embodiment of the present invention. This illustrates the preferred design when only one scan element is used.

A laser/focusing module 10 produces a beam 12 which is reflected from a rotating or oscillating scan mirror 14 to a stationary holographic optical element (HOE) 16. The scanning beam is redirected by the HOE 16 so that the beam scans across an indicia (not shown) to be read.

Reflected light 18 from the indicia is collected by a collection lens 20 which focuses it on to an optical detector 22 via the scanning mirror 14 and a relay lens 24. With the arrangement shown, the field of view of the detector 22 is effectively scanned across the indicia in synchronisation with the scanning outgoing light beam. Since the outgoing beam always tracks the scanned field of view, the field of view can be made relatively small, thereby providing a good signal-to-noise ratio. Since the scanning mirror 14 is no longer the limiting aperture for the received light, the detected signal remains high independently of the size of the scanning mirror. This means that the scanning mirror can be made small and light, thereby reducing energy consumption and permitting high frequency scanning.

It will be understood by the skilled man that the scanning mirror 14 could be replaced by any other appropriate scanning element 14 such as a rotating or oscillating prism, polygon, lens, holographic optical element or diffraction grating. The holographic optical element 16 could likewise be replaced with any other appropriate stationary optical element 16 such as a mirror, prism, lens or diffraction grating. Finally, both the collection lens 20 and the relay lens 24 could be replaced with other suitable collection optics, for example mirrors, holographic optical elements, diffraction gratings or any combination thereof. In a particularly convenient arrangement, the collector 20 may comprise a concave mirror.

Figure 2A:
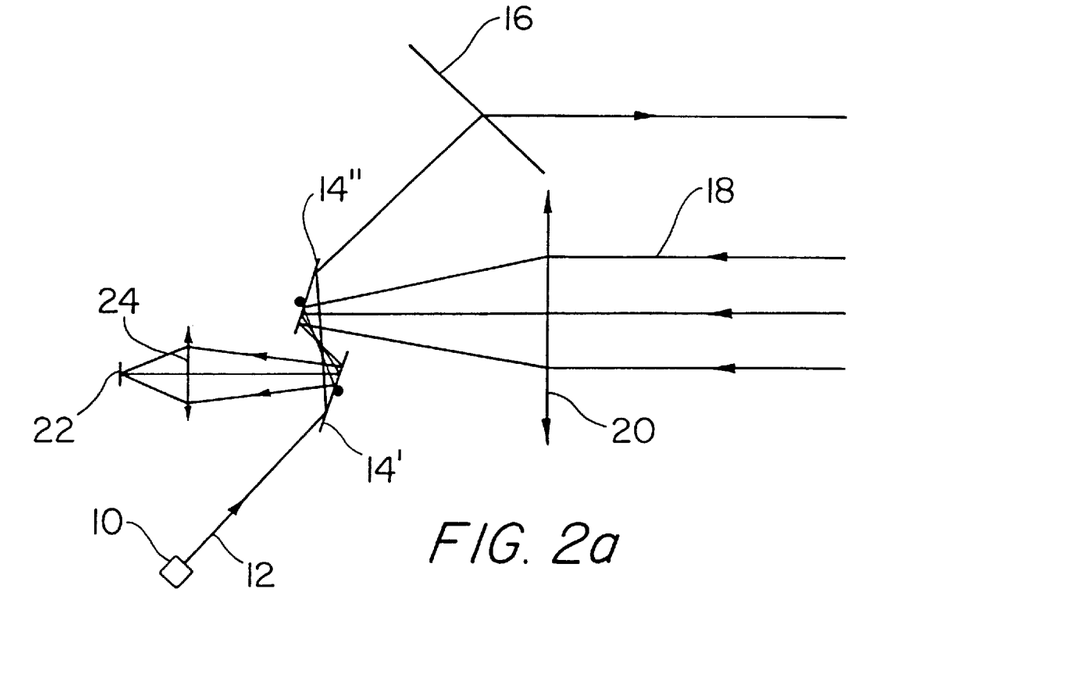
FIG. 2a illustrates schematically a second embodiment.

In the embodiment of FIG. 1a, the scan element 14 may provide either a one dimensional or a two dimensional scanning pattern. FIG. 2a illustrates an alternative arrangement using two separate scan elements 14', 14" to provide a two dimensional scanning pattern. Elements corresponding to those shown in FIG. 1a are given the same reference numerals.

Figure 2B:
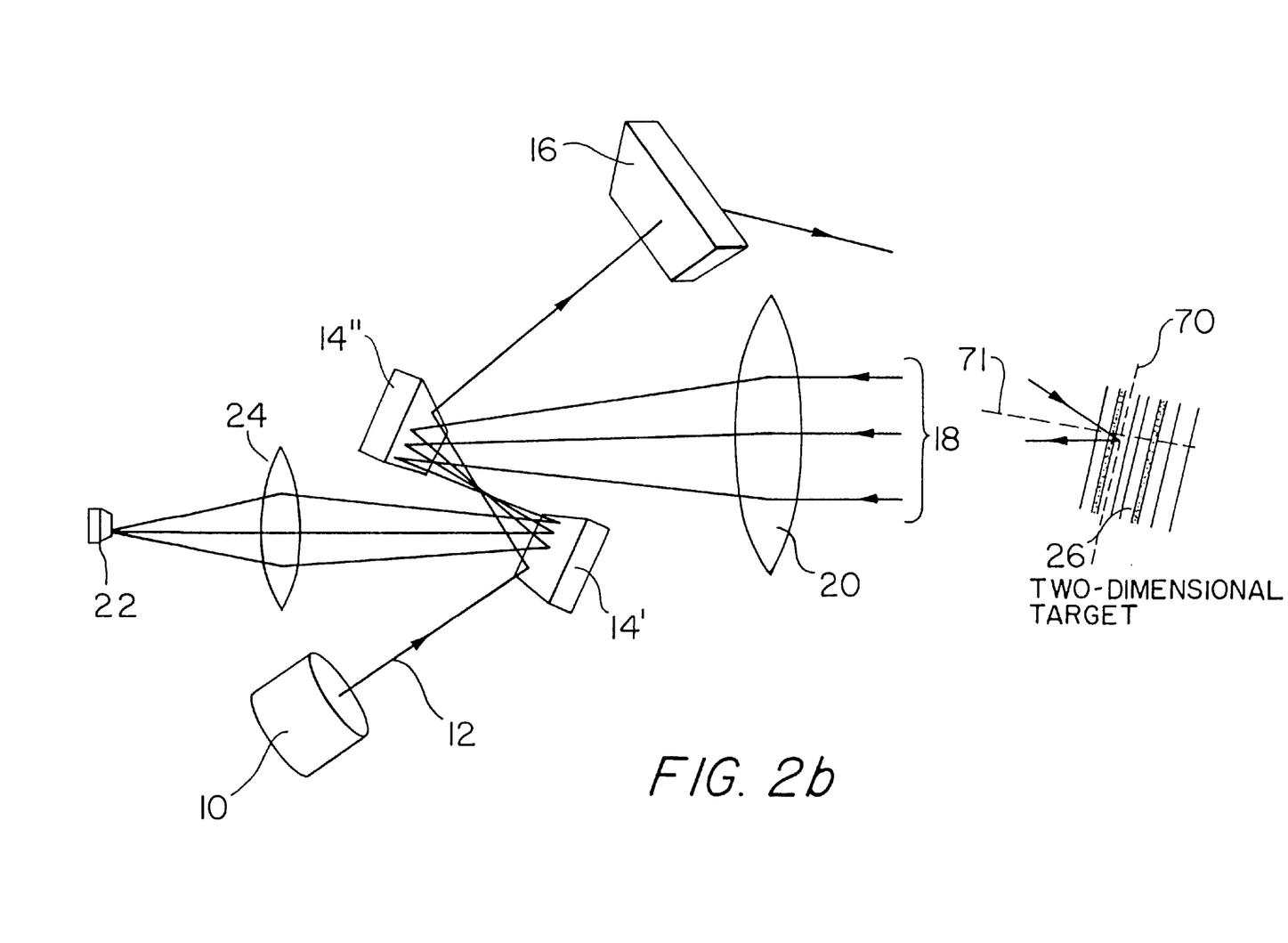

In FIGS. 2a and 2b the scan element 14' preferably scans the beam into and out of the plane of the paper (along scan line 71 in FIG. 2b, for example), whereas scan element 14" scans the beam within the plane of the paper (along scan line 70 in FIG. 2b, for example). It will be seen that both the outgoing beam 12 and the incoming reflected light 18 is deflected by both of the scanning elements 14', 14".

In both FIG. 1a and FIG. 2a it is shown that the outgoing laser beam 12 passes through the focus of the collected light beam 18. It is also shown in FIG. 2a that this focus is about half way between the two scan elements 14',14". Neither of these are necessary conditions, and it is well within the capabilities of the skilled artisan to adjust the angles and positions of the various optical elements to achieve the desired result for a given scanning working distance.

Figure 1B:
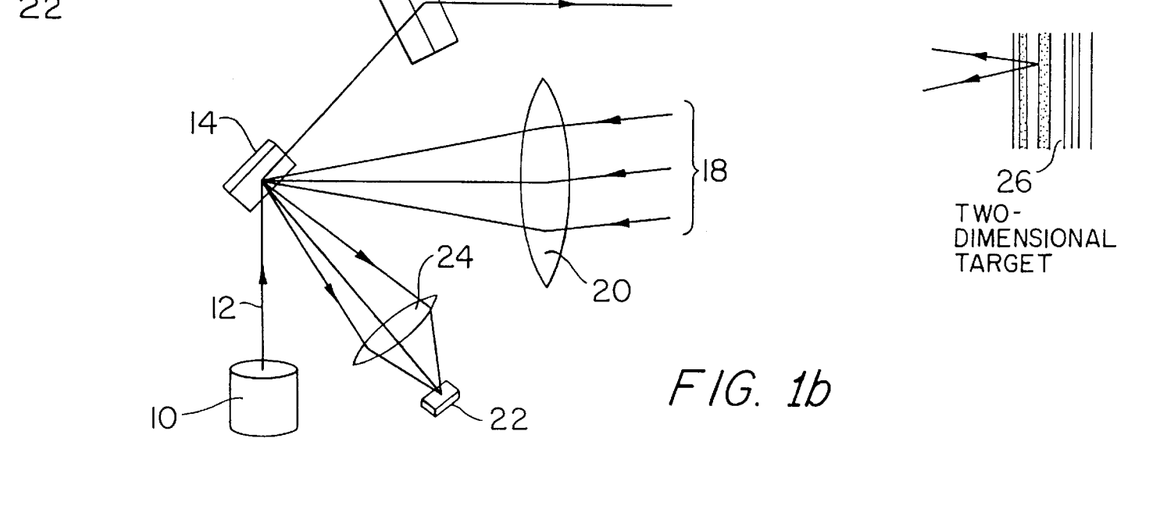

FIGS. 1b and 2b show the arrangements of FIGS. 1a and 2a respectively in perspective view, targets comprising bar code symbols 26 being shown.

Figure 3:
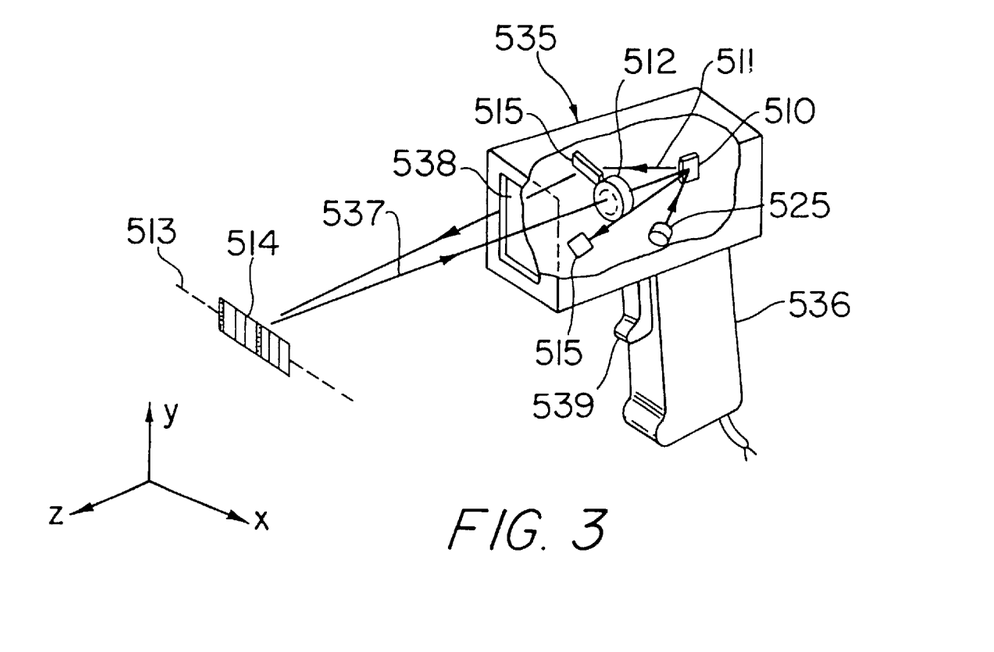
FIG. 3 shows an exemplary hand-held scanner which may incorporate within it either the embodiment of FIG. 1a and 1b or that of FIG. 2a and 2b.

FIG. 3 illustrates, as an example, a suitable type of hand-held laser scanner into which either of the embodiments of FIGS. 1 or 2 may be incorporated. The scanner comprises a main body 535 having a graspable hand portion 536 which carries a trigger 539. Within the body 535 is a laser module 525. Light from the laser module 525 is arranged to shine onto an oscillating mirror 510. The resulting scanning beam 511 passes through a holographic optical element 515, and out of the housing via a window 538. The mirror 510 and the HOE 515 are so arranged that the beam 511 traces out a scan line 513 across an indicia 514 to be recorded. Reflected light 537 from the indicia passes through the window 538 and is collected by a collecting lens 512 which focuses it on to an optical detector 515 via the scanning mirror 510. The optical signal is then converted into an electrical signal, and the features of the indicia 514 determined.

In an alternative embodiment (not shown) the HOE 515 (or 16 in FIGS. 1 and 2) could comprise the exit window 538.

Figure 4:
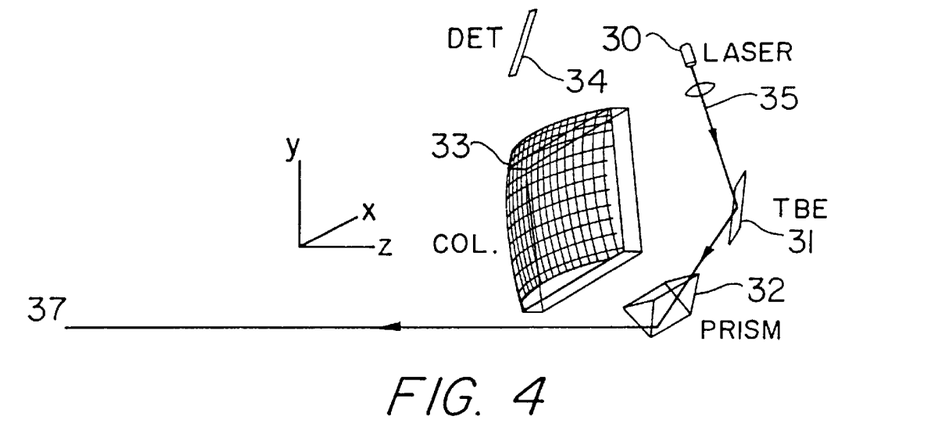
FIG. 4 illustrates schematically a scanner according to a further embodiment of the invention.
Figure 5:
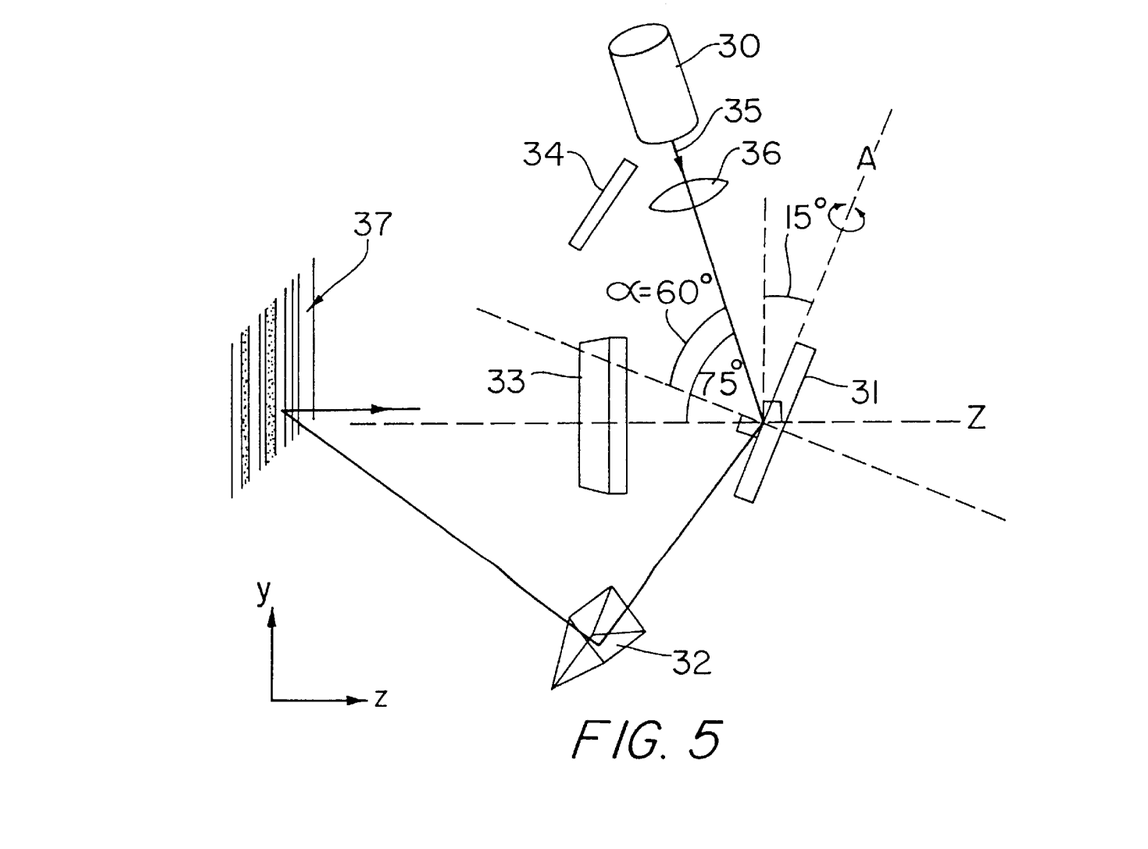
FIG. 5 is a side view of the scanner of FIG. 4.

Referring now to FIGS. 4 to 10 further aspects of the invention will now be described. A one-dimensional semi-retro reflective scanner ("semi-retro") is shown in FIGS. 4 and 5 comprising a laser source 30, a scanning mirror 31, a further reflector, in this case a prism 32, a collector 33 and a detector 34. The scanning mirror can be a (TBE—Taut Band Element) 31 located at half the focal distance of the collector lens 33 as a result of which rays incident on the collector 33 are not focused at the scanning mirror 31 but at the detector 34, the detector 34 being suitably positioned. The taut band element comprises a flex element carrying a permanent magnet such that it is caused to oscillate by an electromagnetic coil driven by an AC current. A further flex element can be provided to allow the light beam to be scanned in a second direction. The holographic optical element 16 shown in FIGS. 1 and 2 is replaced by a prism 32; of course the hologram could be retained. The design is suitable for one-dimensional scanners with small scanning mirrors and gives rise to a signal to noise ratio which is approximately midway between that achieved by a full retro collective system and a fully non-retro collective system using a lens and a large dimensioned detector.

The system layout is shown effectively in three dimensions in FIG. 4, defined by the axes x,y,z shown in that figure. A side view of the arrangement is shown in FIG. 5, in the y-z plane. As can be seen the laser 30, scanning element 31, collector 33 and detector 34 at least are all contained in the same plane, that is, all having their longitudinal axis parallel to, and in the same y-z plane. The prism 32 is also provided in the same plane. The prism 32 could in fact, comprise part of the collector lens 33. The scanning element 31 is provided directly behind, and on the same z axis as the collector 33. The detector 34 is located off the z axis and the laser 30 is located yet further off axis. Similarly, the prism is located off axis. As can be seen the laser 30 generates a light beam 35 which may pass through an auxiliary lens 36 before being reflected by the scanning element 31, the prism 32 and the indicia to be read, for example a bar code symbol 37.

The collector 33 is a plano convex lens having a cylindrical front surface and having in the exemplary embodiment shown, a size of 20×10 mm. The focal length of the lens is approximately twice the distance to the scanning element 31 although it could be, for example, anywhere between 1½ and 3 times the distance between the collector 33 and the scanning element 31. Preferably the scanning element 31 is not provided at the focal length as a large scanning element would be required to collect off-axis images. In the embodiment shown the lens has, using the parameters used in ray tracing, an index of 1.6, a radius of 20 mm and a centre thickness of 5 mm.

The scanning element 31 in the exemplary embodiment is a small scanning mirror (TBE) of dimensional 4×6 mm, its shorter side being parallel to the x axis (going into the page in the arrangement shown in FIG. 5). The scanning element 31 is positioned 30 mm from the back surface of the collector and is tilted at an angle of 15° to the vertical as can be seen in FIG. 5. The tilt axis runs parallel to the x axis passing through the vertical centre of the scanning element 31. The scanning element 31 is arranged with its scanning axis parallel to the y-z plane, for example about the longitudinal axis of the scanning element 31 designated generally as A in FIG. 5.

The laser source 30 is arranged to generate a laser beam in the y-z plane of FIG. 5 at an angle of 75° to the x axis, that is, at an angle of 60° to the normal of the scanning element 31.

The detector has dimensions 1.5 by 5 mm, the long side extending substantially in the vertical (y axis) direction although it can be slightly angled relative to the y axis. The system as a whole is arranged such that the lower end of the detector is the focus of the incoming beam when the target is at 200 mm from the system. It will be appreciated that as the target (for example a bar code symbol 37) moves closer to the system two effects are observed. Firstly de-focusing causes the detector 34 to be over-filled, which is generally referred to as the "optical AGC (Automatic Gain Control)" effect. Secondly, as a result of the parallax effect, the focus "walks" upwards along the detector.

The walking effect can be used as a measure of the range of the target. In effect, the height of the beam incident on the detector 34 would provide an indication of the distance of the target from the system. Indeed, the detector 34 can be in a modular form, divided into cells such that the distance to the target can be estimated by identifying which cell detects the incoming light beam. In the non-cellular version, a single elongate detector is required to detect light from different distances.

The semi-retro reflective or "semi-retro" effect is created by the incoming or collected ray angles being corrected in the x-z plane by the scanning element 31. The system can best be understood from a consideration of FIGS. 6 and 7 which show a view of the system from above (in the x-z plane). It will be appreciated that the laser and detector elements, located directly above the collector lens 33 and the prism element located below the collector element 33 are not shown for purposes of clarity. Assume firstly that the laser beam from the laser source 30 (not shown) is generated along to the z axis and in the plane of the page such that it passes through the centre of the lens and is incident on the centre of the scanning element 31. When the scanning element 31 has scanned through an angle θ to its rest position perpendicular to its axis (the x-axis) the laws of optics teach that the incident beam travelling along the z axis will be reflected at an angle 2θ to the incident direction (it being assumed that the scanning element 31 extends perpendicularly out of the page).

Similarly, the incoming collected light reflected from the target will arrive at an angle 2θ off axis at the focal plane of the collector lens 33 which, in the embodiment shown, is twice as far from the collector lens as the scanning element 31 is. As can be seen from FIG. 7, light incident at an angle 2θ to the z-axis on a scanning element 31 angled at θ to the x-axis will be reflected back parallel the z-axis.

Figure 6:
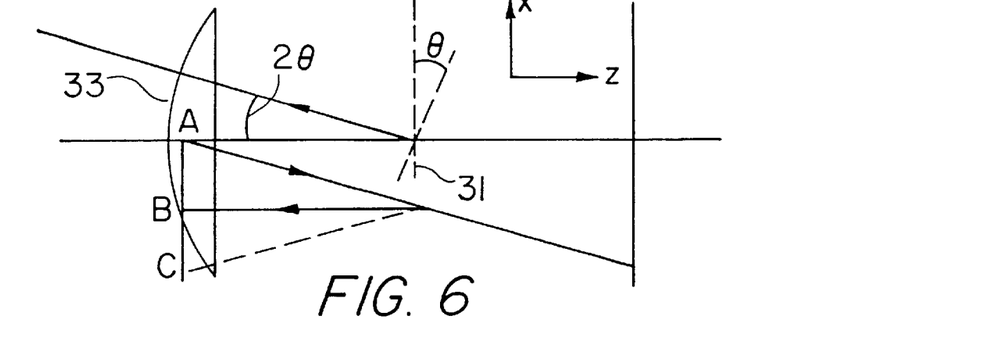
FIG. 6 is a top view of the scanner of FIG. 4.

For example, referring to FIG. 6, the light emanating from A reflected by an appropriately extended scanning element 31 at angle θ to the x-axis will be reflected to point B. It will be seen that this contrasts with the situation that would be achieved by a stationary mirror aligned with the x axis in which case light would be reflected to point C from point A. However it will be appreciated that the detector is provided in the y-z plane and thus it is desirable for the corrected light returning from the target to be focused by the scanning mirror at A. It will be seen from FIG. 7 that if the angle of the scanning element 31 to the x-axis was doubled to 2θ to the x axis then, light incident at an angle 2θ to the z axis from point A would be returned to point A (i.e. along the normal to the mirror 31 in both directions). Accordingly, the system could be improved if it was possible for the effective angle of the scanning element seen by the collected light to be twice the scan angle of the element 31 seen by the beam generated by the laser.

Figure 7:
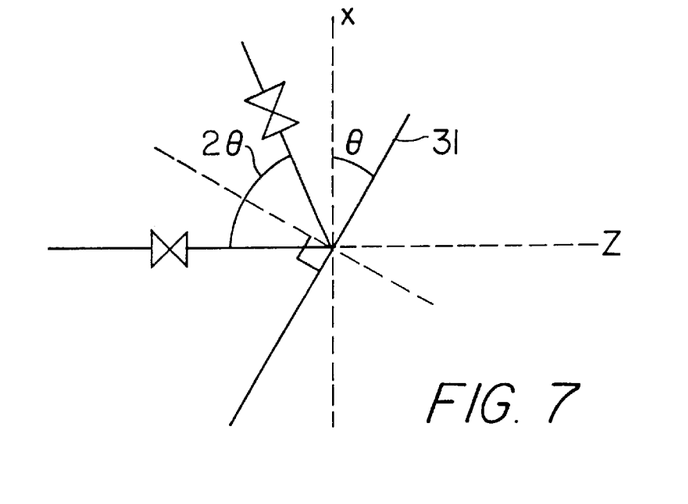
FIG. 7 illustrates the relationship between incident and reflected light on an angled scanning element for the further embodiment.

This "semi-retro" effect is achieved by providing the laser 30 at the large off axis angle discussed above, that is, 60° to the normal of the scanning element 31. If similar calculations to those set out above are carried out relative to a coordinate frame parallel to the scanning mirror's rest position, where the scanning element 31 is at an angle θ to its rest position viewed in the x-z plane (that is from above) and the incoming ray from the laser source 30 is at an angle α to the z axis in the y-z plane, then the outgoing ray reflected by the scanning element 31 has a direction:

(cos α sin 2θ, sin α, cos α cos 2θ).

Given that the maximum angle θ through which the scanning element 31 rotates is very small, a small angle approximation sin θ=θ can be made. Accordingly, given that α=60° it will be seen that the x-direction scanned angle is approximately θ, or half of the normal scanned angle. Accordingly the object discussed above is achieved allowing the semi-retro concept to be realised.

Figure 8:
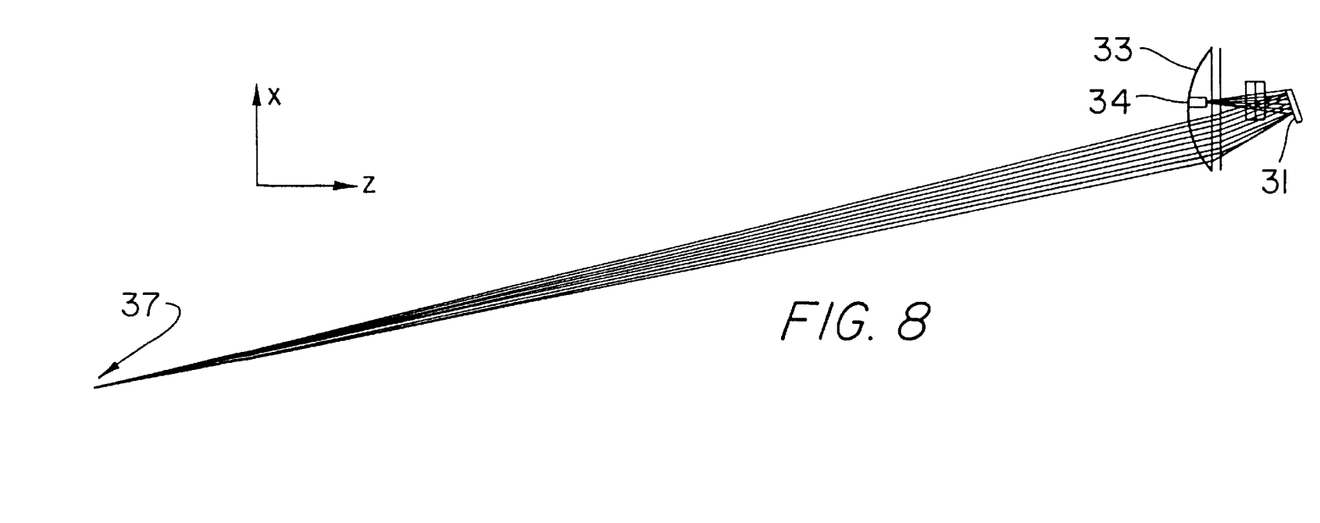
FIG. 8 is a top view illustrating the behaviour of light collected by the scanner of the further embodiment.
Figure 9:
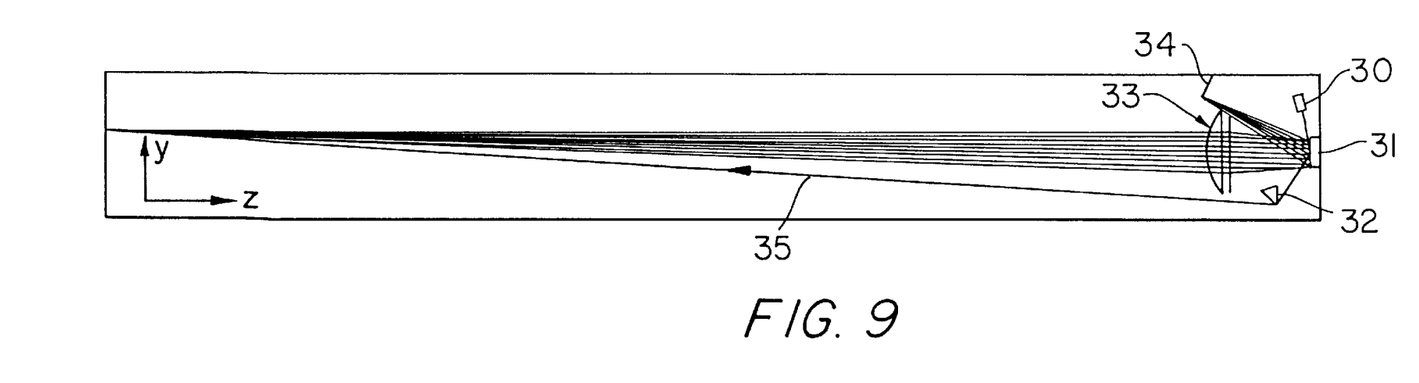
FIG. 9 is a side view illustrating the behaviour of light collected by the scanner of the further embodiment.

The effect can be seen, viewed from above, in FIG. 8. The figure shows the light reflected from a target 37, being collected by collector lens 33, reflected by scanning element 31 and focused on the detector 34. The view shown in FIG. 8 is taken from an actual ray trace as a result of which the effect of coma as the main aberration is visible. The arrangement can also be viewed in FIG. 9, this time from the side, the outgoing beam 35 also being visible. Of course, one of the sacrifices of the design is that the optically scanned angle is only that achievable by the maximum angles of rotation of the scanner element, instead of twice as much.

Figure 10:
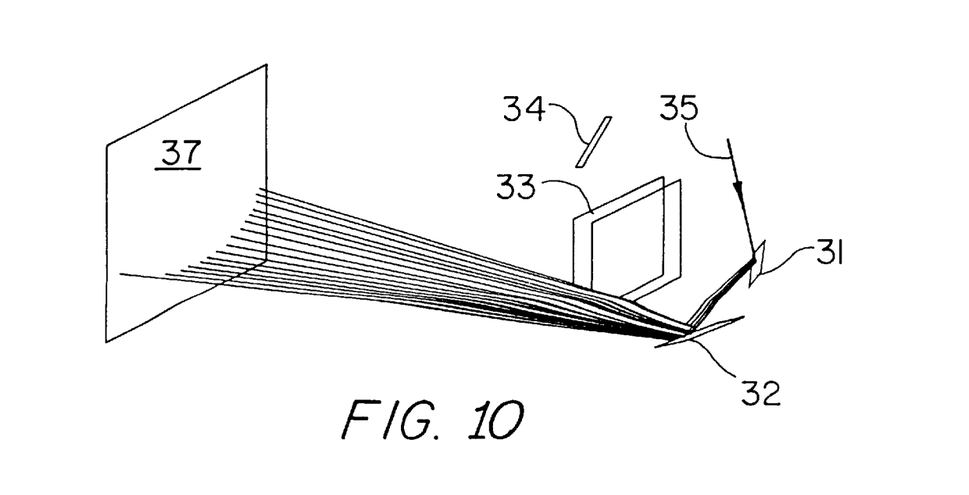
FIG. 10 illustrates the "scan-bow" effect observable in the further embodiment.

FIG. 10 shows a further effect caused by the severe off-axis angle of the initial laser beam 35, namely the noticeably scan-bow effect, that is, the tracing of a segment of a conic section by the laser beam incident on the target 37 as a scanning element 31 scans. In FIG. 10, a reflector 32 has been used in the place of the prism 32 shown above. The scan-bow is approximately 12% and, as it forms a conic section is independent of the target 37 distance. In the arrangement shown in FIGS. 4 and 5 the scan-bow is corrected by the prism 32 which alters the location and the direction of the bow at different bow directions, thus levelling out the bow. The scan-bow in the arrangement of FIGS. 4 and 5 is from −1.2% at 50 mm to the collector to 0.7% at 200 mm to the collector, the negative sign signifying that the centre of the bow is above the end points. The dihedral angle of the prism is 60°, which is adjusted to suit the deflection angle needed. The orientation of the prism controls the amount of the scan-bow correction. Where appropriate, the prism 32 may be replaced by a hologram.

A relay lens may be provided between the scanning element 31 and the collector 33 (not shown in the drawings) allowing the provision of a smaller detector without affecting the optical properties of the system.

Referring once more to FIG. 8, it can be seen that vignetting occurs at the collector 33 as not all of the light reflected by the target 37 is collected by the collector 33. Similarly, vignetting occurs at the detector 31 at the near end (or when the object distance is 50 mm). The collected power can be calculated by ray tracing giving rise to the following table (in which results are given in sr):

| object distance | 200 | 100 | 50 |
|---|---|---|---|
| θ = 0° | 1.9 | 3.9 | 4.1 |
| θ = 15° | 1.3 | 4.2 | 4.2 |

It should be noted that the depth-of-focus of the semi-retro system is inherent in the design of the system. Accordingly, when the ambient light is lower, the depth of focus does not increase once it reaches the design limit in contract with retro and non-retro systems. The design depth-of-focus determined by the length of the detector which is the effect of parallax in the y direction. The parallax may be removed by folding the outgoing ray back onto the y-z plane which would, however, involve additional optical elements.

According to another aspect described with reference to FIG. 11 the invention relates to a system allowing automatic range-finding, that is, evaluating the distance from the scanner to the bar code symbol or other indicia to be read. Current hand-held solid state imaging (HHSSI) scanners do not have any built-in device or technique for range-finding, resulting in the HHSSI scanners having a limited depth of field as compared to laser scanners as a result of the dependence of the system on the size of the image relative to the dimensions of the detector. In known HHSSI scanners the depth of field can be increased by using a high quality optical system, however that severely increases the cost of the scanner. The arrangement shown in FIG. 11 is a low cost optical system overcoming the problems with earlier scanners.

Figure 11:
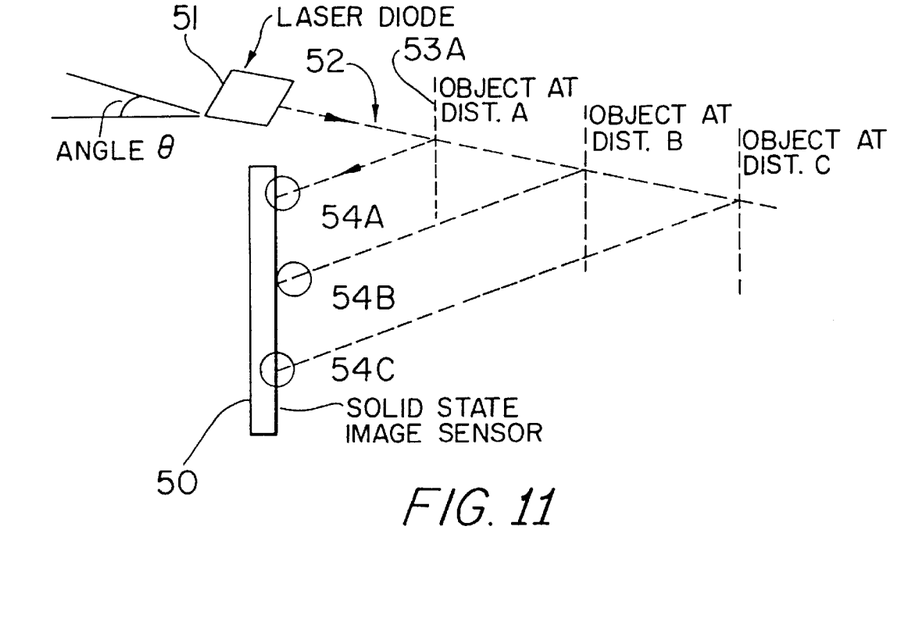
FIG. 11 illustrates a range-finding system according to a still further embodiment of the invention.

The arrangement shown in FIG. 11 includes a two-dimensional solid state image sensor (such as a charge coupled device or CCD array) 50 and a light generator comprising a laser diode 51. The arrangement may be found in a scanner gun such as that shown in FIG. 3. The laser diode 51 is mounted at an angle θ to the sensor or detector 50 and when an object is placed in front of the system, the laser beam 52 emitted by the laser diode is reflected from the object (for example that shown at 53a) and is imaged by a small group of pixels on the detector 50, at region 54a. The object may, as mentioned above, be a bar code symbol or any other graphic indicia to be read.

As will be seen, dependent on the positioning of the object at distance A,B or C (corresponding to 53a,53b and 53c) the height at which the reflected laser beam impinges on the detector 50 varies. Of course the position may also vary in the direction normal to the plane of the page as well. By taking a frame of an image when the scanner is actuated and finding the x-y location of the group of pixels detecting the reflected beam the distance of the bar code can be found. For example if the light is detected at positions 54a, 54b or 54c the distance of the object can be identified as distance a, distance b or distance c respectively. Once the distance is obtained the optical system can be adjusted to focus at that distance or the image can be deblurred electronically to obtained a sharply focused image.

Figure 12:
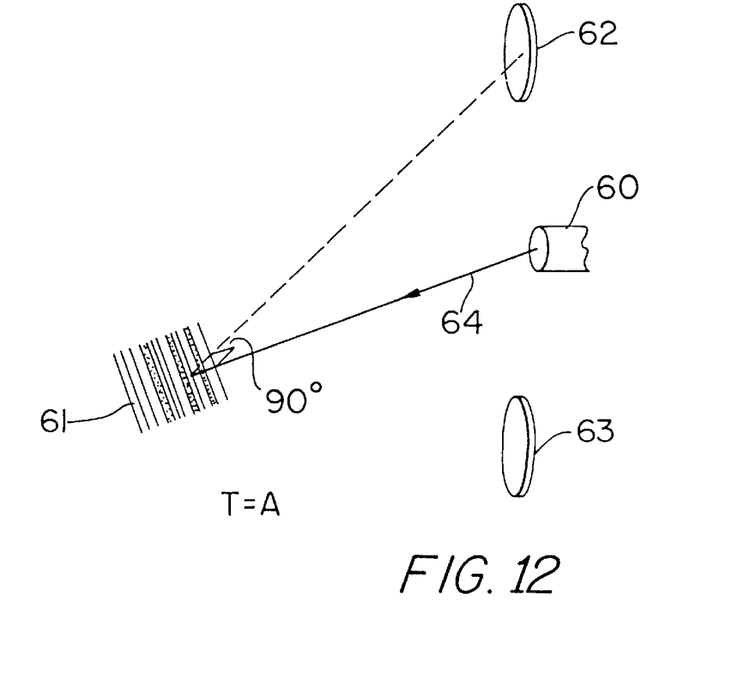
FIG. 12 illustrates schematically an omnidirectional scanner according to a further embodiment of the invention.

Referring to FIG. 12 a further problem associated with known arrangements, that of undesirable specular reflection is addressed. The problem arises particularly in omni-directional scanners with single point light sources.

In particular, even if, at a given time, the direction in which the light source is pointing is known, the orientation of the target bar code symbol at any time is not known. FIG. 12 shows a single light source 60, a bar code 61 at a given orientation, a first photodetector 62 and a second photodetector 63. At a time A the light source generates a beam in the direction shown by ray 64 and the bar code is oriented at the (arbitrary) orientation shown. A 90° deflection of the beam 64 into the first photodetector 62 causes specular "blinding". Accordingly, if the first photodiode 62 is off and the second photodiode 63 is on then there will be no specular reflection problem.

As mentioned above, however, the orientation of the target 61 at any time is not known. Accordingly in order to overcome this problem it is simply necessary to make the on/off sequence of the photodetectors dynamic, for example random in order to overcome the specular blinding problem in the manner discussed above at time A. Of course the same approach could be taken when more than two photodetectors were taken by varying the on/off sequence amongst all of the photodetectors appropriately.

While the invention has been illustrated and described with reference to several specific embodiments, it is not intended to be limited to any of the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should be and are intended to be comprehended within the meaning and range of equivalence of the following claims.

What is claimed as new and desired to be protected by Letters Patent is set forth in the appended claims:

1. A system for reading indicia having areas of differing light reflectivity on a target, comprising:

a light source for producing an outgoing light beam;

a scanning first optical element for receiving the light beam and producing a scanning outgoing light beam therefrom;

a second optical element for receiving the scanning light beam and redirecting the scanning beam in a direction towards the target so as to produce a scan across the indicia to be read;

a light detector having a field of view for detecting the light reflected from said indicia and producing electrical signals responsive to the light received; the scanning first optical element receiving light reflected back from the indicia and directing such light to the detector, so that the detector images a field of view across the indicia.

2. A system as claimed in claim 1 in which the second optical element is a holographic optical element.

3. A system as claimed in claim 1 in which the second optical element is a diffraction grating.

4. A system as claimed in claim 1 in which the second optical element is a mirror.

5. A system as claimed in claim 1 in which the second optical element is a lens.

6. A system as claimed in claim 1 in which the second optical element is a prism.

7. A system as claimed in claim 1 in which the first optical element is a mirror.

8. A system as claimed in claim 1 in which the first optical element is a lens.

9. A system as claimed in claim 1 in which the first optical element is a holographic optical element.

10. A system as claimed in claim 1 in which the first optical element is a diffraction grating.

11. A system as claimed in claim 1 including an optical collector for collecting the reflected light and for directing it, via the scanning first optical element, to the detector.

12. A system as claimed in claim 11 in which the optical collector is a mirror.

13. A system as claimed in claim 11 in which the optical collector is a lens.

14. A system as claimed in claim 11 in which the optical collector is a holographic optical element.

15. A system as claimed in claim 11 in which the optical collector is a diffraction grating.

16. A system as claimed in claim 11 in which the optical collector directs the reflected light to the detector via the first scanning optical element and a relay optical element.

17. A system as claimed in claim 16 in which the relay optical element is a lens.

18. A system as claimed in claim 16 in which the relay optical element is a mirror.

19. A system as claimed in claim 16 in which the optical collector brings the reflected light to a first focus adjacent the scanning first optical element, and the relay optical element brings the reflected light to a second focus at the detector.

20. A system as claimed in claim 1 in which the first scanning optical element produces a one-dimensional scan line.

21. A system as claimed in claim 1 in which the first scanning optical element produces a two-dimensional scan pattern.

22. A system as claimed in claim 21 in which the first scanning optical element comprises a first scanning portion for producing a beam scanning in one direction and a second scanning portion for receiving said beam scanning in one direction and for producing therefrom a two-dimensional scan pattern.

23. A system as claimed in claim 11 in which the first scan optical element comprises a first scanning portion for producing a beam scanning in one direction and a second scanning portion for receiving said beam scanning in one direction and for producing therefrom a two-dimensional scan pattern, and in which the optical collector brings the reflected light to a first focus intermediate the first scanning portion and the second scanning portion.

24. A system as claimed in claim 11 in which the optical collector brings the reflected light to a first focus, the outgoing light beam passing through the first focus.

25. A system as claimed in claim 1 including a housing having an aperture therein through which the reflected light passes, the second optical element comprising a window in the aperture.

26. A scanner for reading indicia having areas of differing light reflectivity, the scanner comprising:

a light source for producing a light beam;

a scanning first optical element for receiving the light beam and producing a scanning outgoing light beam therefrom;

a second optical element for receiving the scanning light beam and redirecting the scanning beam in a first direction to scan across an indicia to be read; and a light detector having a field of view;

whereby light reflected back from the indicia in a second direction corresponding to the first direction is received at the scanning first optical element and is directed to the detector, thereby scanning the field of view of the detector across the indicia.

27. A reader for reading indicia having areas of differing light reflectivity, comprising a light source for producing an outgoing light beam;

a scanning first optical element for receiving the light beam and producing a scanning outgoing light beam therefrom;

a second optical element for receiving the scanning light beam and re-directing the scanning beam towards the indicia;

a collector for collecting light reflected from the indicia and directing the collected light towards the first optical element; and a detector for detecting collected light reflected from the first optical element; wherein the light source, first optical element and collector are provided in a common plane, the collector and first optical element being provided on a common optical axis and the light source being arranged to generate a beam at a substantial angle to the common optical axis.

28. A reader as claimed in claim 27 in which the light source is arranged to generate a light beam at an angle of 75° to the common optical axis.

29. A reader as claimed in claim 27 in which the first optical element comprises a scanning mirror inclined at an angle of 15° to the normal to the common optical axis.

30. A reader as claimed in claim 27 in which the second optical element comprises a prism provided in the common plane located at a position off the common optical axis.

31. A reader as claimed in claim 30 in which the prism is configured and positioned to minimize the "scan-bow" effect.

32. A reader as claimed in claim 27 in which the first optical element is located at a distance one half the focal length of the collector from the collector.

33. A reader for reading indicia having areas of differing light reflectivity on a target, comprising:

a light source for producing an outgoing light beam; and at least two detectors spaced apart from one another for detecting light reflected from the target wherein the detectors are arranged to be switched on and off in a dynamic sequence.

34. A reader as claimed in claim 33 in which the detectors are arranged to be switched on and off in a random dynamic sequence.

* * * * *